(12) United States Patent
Barlow et al.

(10) Patent No.: US 7,802,142 B2
(45) Date of Patent: Sep. 21, 2010

(54) HIGH SPEED SERIAL TRACE PROTOCOL FOR DEVICE DEBUG

(75) Inventors: Howard Barlow, Loveland, CO (US); Daniel Nylander, Longmont, CO (US); Robert Metz, Westminster, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 413 days.

(21) Appl. No.: 11/951,824

(22) Filed: Dec. 6, 2007

(65) Prior Publication Data

US 2009/0150728 A1    Jun. 11, 2009

(51) Int. Cl.
G06F 11/00 (2006.01)
(52) U.S. Cl. .......................................... 714/30
(58) Field of Classification Search .................. 714/30
See application file for complete search history.

(56) References Cited

U.S. PATENT DOCUMENTS

| | | | |
|---|---|---|---|
| 5,978,902 A | 11/1999 | Mann | |
| 6,145,100 A | 11/2000 | Madduri | |
| 6,154,856 A | 11/2000 | Madduri et al. | |
| 6,154,857 A | 11/2000 | Mann | |
| 6,167,536 A | 12/2000 | Mann | |
| 6,175,914 B1 | 1/2001 | Mann | |
| 6,189,140 B1 | 2/2001 | Madduri | |
| 6,243,836 B1 | 6/2001 | Whalen | |
| 6,493,837 B1* | 12/2002 | Pang et al. | 714/45 |
| 6,615,370 B1* | 9/2003 | Edwards et al. | 714/45 |
| 6,918,057 B1* | 7/2005 | Brophy et al. | 714/30 |
| 6,934,898 B1* | 8/2005 | Goff | 714/727 |
| 6,997,981 B1 | 2/2006 | Coombs et al. | |
| 7,017,093 B2* | 3/2006 | Broberg, III | 714/724 |
| 7,080,283 B1* | 7/2006 | Songer et al. | 714/30 |
| 7,143,205 B2* | 11/2006 | Sakugawa | 710/22 |
| 7,203,460 B2 | 4/2007 | Boose et al. | |
| 7,216,276 B1 | 5/2007 | Azimi et al. | |
| 7,308,629 B2 | 12/2007 | Whetsel | |
| 7,571,364 B2* | 8/2009 | Whetsel | 714/726 |
| 7,657,808 B2* | 2/2010 | Whetsel | 714/727 |
| 2003/0145255 A1* | 7/2003 | Harty et al. | 714/48 |
| 2005/0015669 A1* | 1/2005 | Duron et al. | 714/30 |
| 2006/0294426 A1* | 12/2006 | Agarwala et al. | 714/30 |
| 2008/0250275 A1* | 10/2008 | Walker et al. | 714/45 |
| 2008/0301500 A1* | 12/2008 | Genden et al. | 714/30 |

* cited by examiner

Primary Examiner—Bryce P Bonzo
(74) Attorney, Agent, or Firm—David K. Lucente

(57) ABSTRACT

Tracing of test information from a hardware device for debugging is formatted for transmission via a high-speed serial protocol. Data from various components in the hardware device is transmitted to an external test board using high speed serial ports. The number of serial ports needed for data transfer is significantly less than a complimentary parallel port configuration. Additional functional blocks on the chip process the data for high speed serial output. The functional blocks format information into subchannels, arbitrate data, append protocol, perform data integrity checks, and serialize the data. The additional blocks built on the chip to support the serial ports consume less chip space than the space consumed by the number of parallel ports required to provide equivalent data transfer rates. The process operates in near real time and may use time stamping to correlate and reconstruct data from different information sources. An input port receives data from the external test component to modify registers or memory, set break points, modify hardware status, communicate with processors, or modify other operating conditions to debug the hardware device.

21 Claims, 7 Drawing Sheets

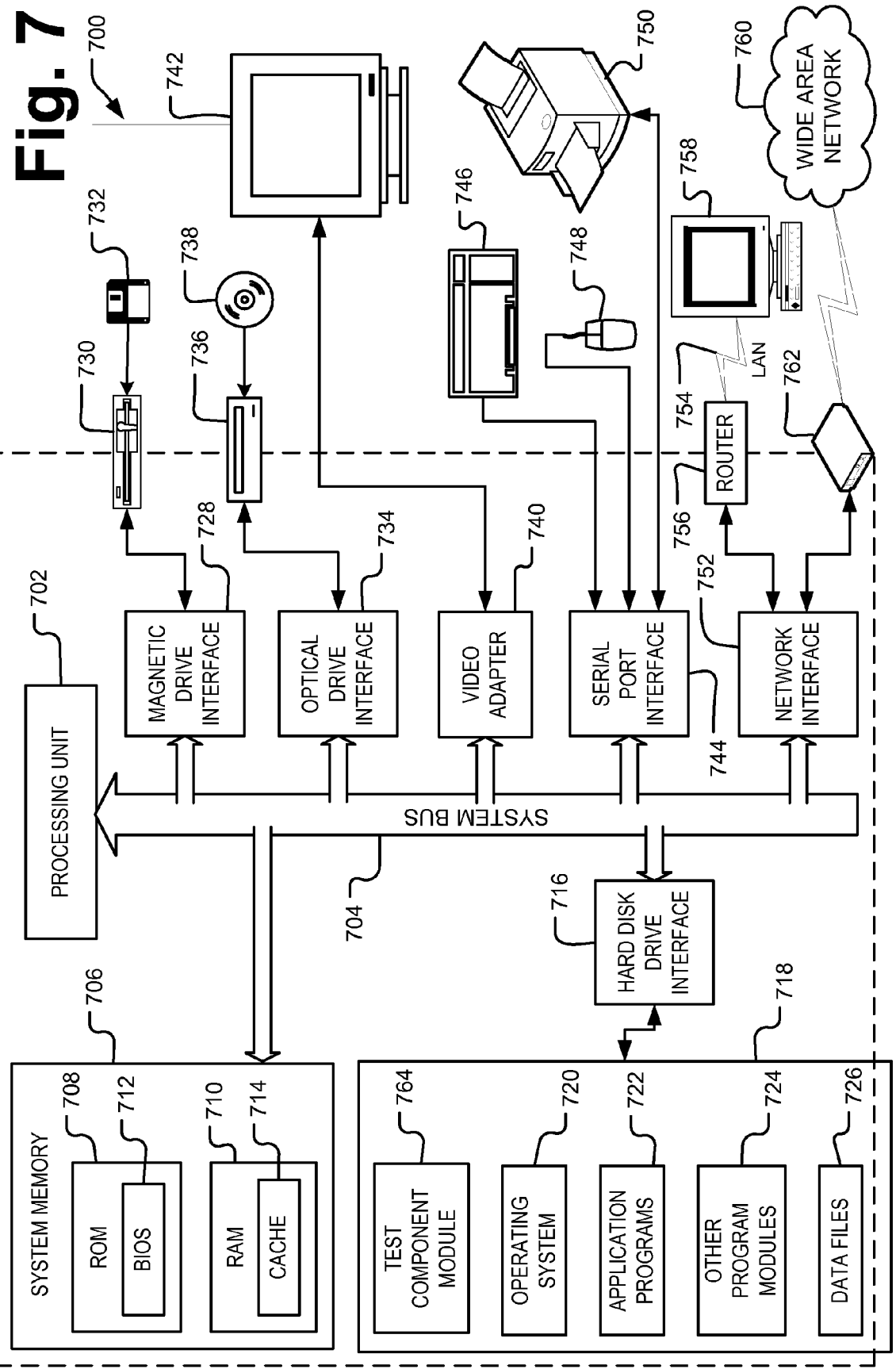

HIGH SPEED SERIAL TRACE PROTOCOL FOR DEVICE DEBUG

BACKGROUND

During manufacture of computer hardware components, for example hard disk drives, it is necessary to "debug" the components to ensure that they are working properly before packaging and shipping for sale. These components may comprise a large number of functional elements or blocks, e.g., microprocessors, buffer memory, and internal test points. Often these functional elements are combined in a single chip or circuit, for example, an application-specific integrated circuit (ASIC). Known testing methods involve using parallel debug ports with a large number of output pins to access data from each of these possible data points during testing. However, on a test chip it is less desirable to have a large number of pins due to the large surface area required to mount a pin. The more silicon used, the greater the cost of the chip. Thus, from a practical standpoint, only a limited number of internal signals can be monitored at one time. Also, parallel ports have bandwidth limitations, which further limit the amount of information that can be output. Further, there is no method to communicate with the chip since these are output only ports. Also, as the speed of microprocessors rises, the high data output (clock) rate across a parallel bus increases and can cause electrical noise and skew issues.

The information included in this Background section of the specification, including any references cited herein and any description or discussion thereof, is included for technical reference purposes only and is not to be regarded subject matter by which the scope of the invention is to be bound.

SUMMARY

A complementary system and method for tracing test information from a hardware device, e.g., a hard disk drive or any other device with a need for external visibility and debug, and outputting the information serially at high speed are disclosed. Data from various information sources, e.g., functional blocks such as microprocessors, buffer memory, internal test points, etc., of an integrated circuit chip in the hardware device, e.g., an ASIC or a field programmable gate array (FPGA), is transmitted to an external test board using high speed serial ports. Additional functional blocks are provided on the chip to process the data for high speed serial output. The serial trace blocks may format information into subchannels, arbitrate data, append protocol, perform data integrity checks, serialize the data, and transmit the data through the serial ports. The external board receives the data, demultiplexes the subchannels, buffers the data, and interfaces with standard trace programs, micro-trace reconstructors, and other data display hardware.

The number of serial ports needed for data transfer is significantly less than a complimentary parallel port configuration. Often the physical chip size is limited and, while unable to accommodate additional pins without an increase in silicon, the chip core may have room for additional blocks sufficient to provide a serial trace system The required number of serial ports for serial trace consume less chip space than the space consumed by the number of parallel ports required to provide equivalent data transfer rates. Thus, serial trace can be an effective and efficient design option for reducing the cost of chips without sacrificing data transfer.

The high speed serial trace process operates in near real time and may use time stamping to correlate and reconstruct data from different information sources in a proper time relationship. Many functions of a hardware device, for example, software checkpoints, buffer management, host interface, servo timing, recording channel, digital to analog conversion values, and other logic blocks can be traced by the serial trace blocks in near real time and in proper timing relationships. A receive port may be additionally provided on the chip to allow the external trace and debug modules to modify registers or memory, set break points, modify hardware status, communicate with processors, or modify other operating conditions to aid in the development and debug process of the hardware device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the present invention will be apparent from the following more particular written description of various embodiments of the invention as further illustrated in the accompanying drawings and defined in the appended claims.

BRIEF DESCRIPTION OF THE DRAWINGS

FIG. 7 is a schematic diagram of a general purpose computing system for providing an interface with the test component.

DETAILED DESCRIPTION

A tracing system and method are disclosed that allow an operational component, e.g., a hardware device, to combine data output from multiple, discreet subcomponents or functional sections or blocks of the hardware device and transmit the data to an external test component using high speed serial ports. The data output may be referred to as "trace data." Tracing is a specialized use of logging to record information about execution of a program or hardware functionality. This information is typically used by programmers or engineers or other users for debugging purposes. The operational component is configured to format the trace data from the various blocks into standardized data frames on subchannels, multiplex the subchannels, apply protocol and integrity check sections to the data frames, time stamp the trace data in the frames; serialize the data, and transmit the data from a serial port. The external test component receives the trace data in a high-speed, serial form, demultiplexes the serial signal, reverses the formatting, and provides the trace data to standard trace debuggers and interfaces for review by users.

The tracing system and method may operate in near real time by using time stamping to correlate and reconstruct the various trace data sources in a proper time relationship. Many functions, for example, software checkpoints, buffer management, host interface, servo timing, recording channel, digital/ analog conversion values, and other logical blocks may be traced.

The operational component may also be equipped with a receive port to allow the external trace and debug components or the user operating such components to correct problems, for example, by modifying registers or memory, setting break points, modifying hardware status, and communicating with processors on the operational component to modify operating conditions to aid in the development and debug process.

Figure 1:
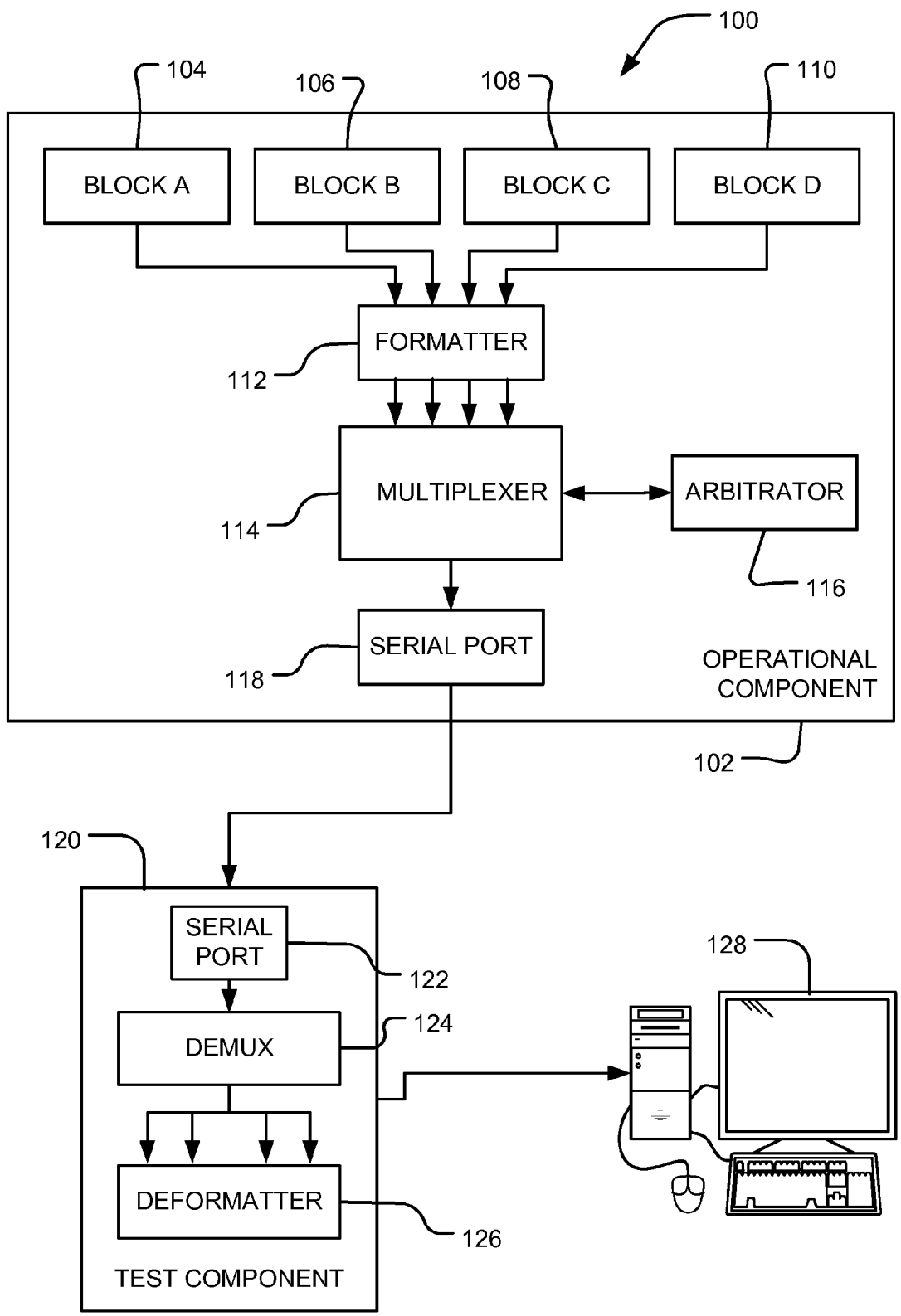
FIG. 1 is a schematic diagram of an implementation of a system for serial trace on an operational component and a corresponding testing component.

FIG. 1 depicts an exemplary implementation of a basic system 100 for performing a serial trace protocol on an operational component 102. The operational component 102 may be any type of hardware device, for example, a hard disk drive, an optical disk drive, a router, a modem, a wireless local area network (LAN) access point, etc. The operational component 102 may be the entire hardware device or subcomponents thereof, for example, a circuit board, an integrated circuit chip (e.g., a, ASIC or FPGA), an interface card, an adapter card (e.g., a video card), or a wireless card. The operational component 102 may be connected with a test component 120 that receives serial data output from the operational component 102. The test component 120 may further be connected with a general purpose computer 128 in order to provide a user an interface for monitoring and directing the debug process.

The operational component 102 may be composed of a number of functional blocks, for example, block A 104, block B 106, block C 108, and block D 110. Each of the functional blocks 104-110 is a subcomponent of the operational component 102. The functional blocks 104-110 may be, for example, one or more microprocessors (e.g., a reduced instruction set computer (RISC) processor), buffer memory, data buses (e.g., a serial advanced technology attachment (SATA) bus), interface cards, internal test points, and any other subcomponents of the operational component 102 that may be desirable for monitoring, testing, and debugging. Output from each of the functional blocks 104-110 may be passed to a formatter module 112. The formatter 112 may be a device or software module that takes information directly from the specific functional blocks 104-110 and formats the information into standardized subchannels. For example, the data output from a microprocessor may be in a different configuration or rate than data output from an interface card. The formatter 112 may standardize data rates, data packet lengths, or other data characteristics in order to create a standard output for data serialization.

As shown in FIG. 1, a single formatter 112 may be used to format trace data received from multiple functional blocks 104-110 presuming the formatter 112 is sufficiently versatile and compatible with multiple input sources. In other embodiments, a specific formatter 112 may be assigned to each of the functional blocks 104-110 with particular utility corresponding to the output of the particular functional block.

The formatter 112 outputs the standardized data feeds corresponding to each of the functional blocks to a multiplexer 114. The multiplexer 114 combines the multiple signals for transmission from the operational component 102 simultaneously across a single physical channel. An arbitrator 116 device or module may be provided in conjunction with the multiplexer 114 to monitor the data flow in each of the subchannels of the formatter 112 and direct the interleaving of data between the subchannels in the multiplexer 114 to maximize throughput of the data in each subchannel. The arbitrator 116 may be a separate device or module or may be part of the functionality of the multiplexer 114. Once multiplexed into a single, serial signal, the data signal may be output from the operational component via a serial port 118.

The serial data signal may be transmitted from the operational component 102 over a communication link to a test component 120 that monitors the trace data corresponding to each of the functional blocks 104-110. The serial data signal is received by a serial port 122 in the test component 120 and is passed to a demultiplexer 124. The demultiplexer 124 separates the serial data signal into constituent signals corresponding to the output of the original functional blocks 104-110. The output of the demultiplexer 124 is then passed to a deformatter 126 that returns the standardized signals to the original data format output from each of the respective functional blocks 104-110. The test component 120 is thereby able to perform diagnostic analysis on the data output from each of the functional blocks 104-110 and identify errors occurring in the operational component 102.

The test component 120 may be connected with a computer system 128 that may provide a user with an interface to view the status of tests and debugging operations, access and manipulate the trace data, and exercise control over the functionality of the test component 120. The user interface may be presented as part of a software program operating on the computer system 128 that controls the connected test component 126.

Figure 2:
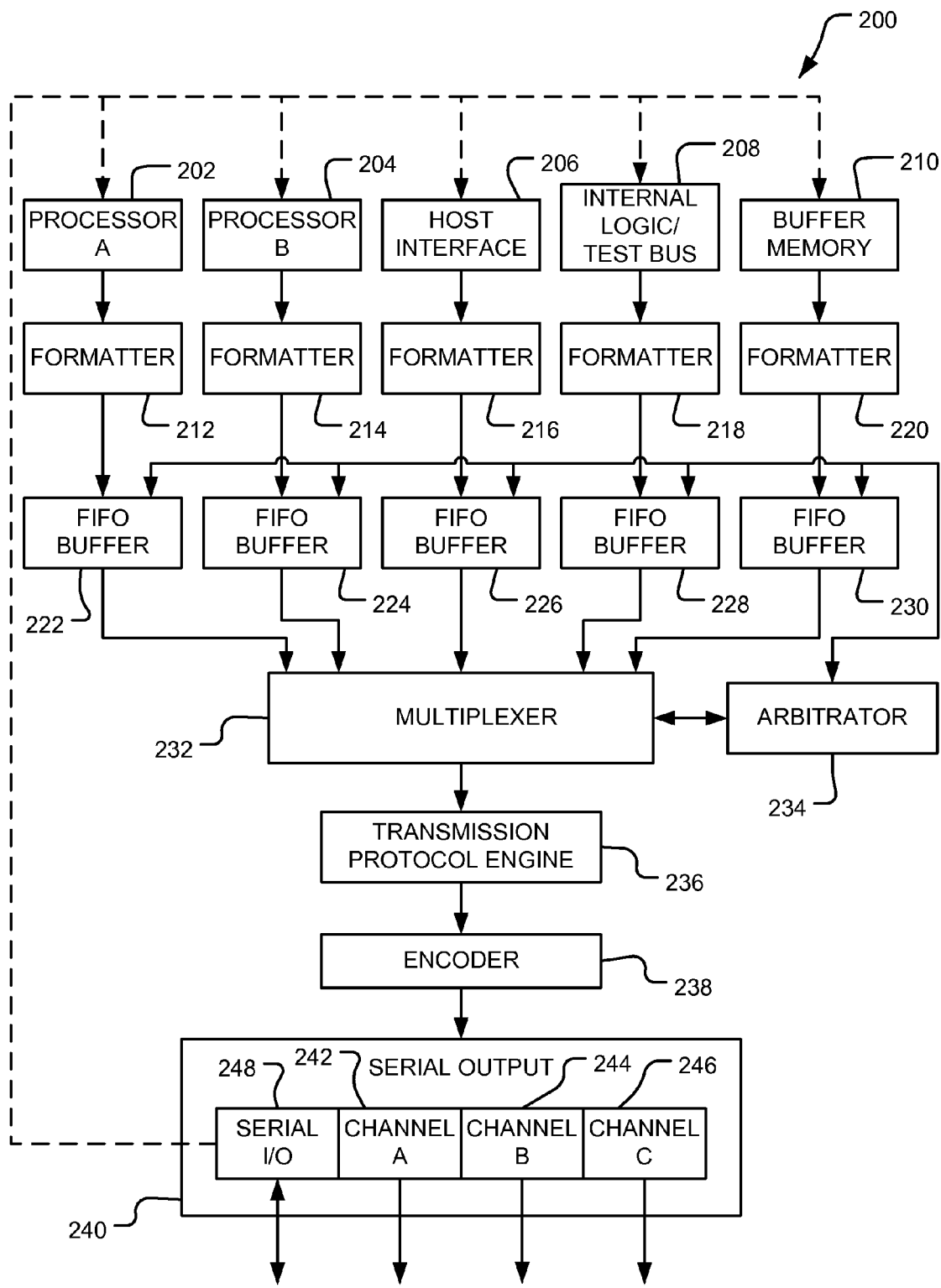
FIG. 2 is a schematic diagram of another implementation of a serial trace system on a hardware component.

Another exemplary implementation of a serial trace implementation on an operational component 200 is presented in FIG. 2. The operational component 200 may again comprise a number of functional devices or blocks that are subcomponents of the operational component 200. The functional blocks often require debugging to ensure that the operational component 200 is functioning properly. Each of the functional blocks may output trace data for analysis as part of the debug process. Exemplary functional blocks on the operational component 200 may include a first microprocessor A 202, a second microprocessor b 204, a host interface 206, an internal logic or test bus 208, buffer memory 210, and others.

Trace data output from each of the functional devices 202-210 on the operational component 200 may be passed to a respective, dedicated formatter block 212-220 that is also integrated as a subcomponent of the operational component 200 to aid in the test and debug process. Each of the formatters 212-220 may be a device or software module that takes information directly from the specific functional blocks 202-210 and formats the information into standardized subchannels of a common data rate. The formatters 212-220 may output the data from each of the functional blocks 202-210 in frames or packets of uniform bit length, append headers to the frames with trace source identification information and time stamps for trace events, and insert error correction segments into the frames. The time stamp is used to keep track of the occurrence of trace of events that do not occur at regular intervals. In one implementation, the time stamp may be a counter that is clocked on a clock common to the formatters 212-220. By using a common clock for time stamps across the formatters 212-220, synchronized time stamps for trace events occurring at the same time on multiple functional blocks may be provided. The time stamp may increment on each clock cycle and roll over after it reaches a maximum count. When a rollover occurs, rollover status information may be presented to the test component.

In addition to time stamping trace events, the formatters 212-220 may also periodically insert a unique bit pattern into the data streams along with a time stamp for alignment synchronization. This insertion may occur every n trace bytes based on the setting of a synchronization frequency register. When this occurs, pattern identification logic in a transmission protocol engine 236 (further described below) detects the event and generates a synchronization signal. This signal is used as an alignment mark to synchronize the trace information between the functional blocks, for example, between processor A 202 and processor B 204. Other trace information can be synchronized as well.

The subchannel data may be sent to a corresponding, dedicated first-in, first-out (FIFO) buffer 222-230 for rate matching. The formatted subchannel data is input into the buffers 222-230 at its original data rate. The buffers 222-230 may provide urgency level alerts, overrun protection, underrun protection, error recovery, error reporting, and other functions. The urgency level alerts provide an indication that the particular buffer is approaching maximum capacity and may overrun. The levels for urgency alerts may be set, e.g., in a register, by the user. The urgent level may be disabled so that the buffer will never go urgent, set to be always urgent, or set anywhere in between. Care should be taken to avoid locking out the other buffers when operating in this mode. In the event that an attempt is made to overrun a buffer, the buffer will not overrun, but will stop accepting data until it has completely emptied. It may then output an error status packet and then resume data input from the trace data source.

The buffers 222-230 also synchronize the trace data output. The input side of each buffer 222-230 receives trace data at the clock speed governing the subcomponent source of the trace data. The output side of each buffer 222-230 empties data at a synchronized rate using a common clock (not shown). In some embodiments, the buffers 222-230 may be programmed to communicate with their corresponding subcomponents 202-210 to regulate the data flow. For example, a functional block generating trace data may reset the corresponding buffer if needed. Similarly, the buffer may provide throttle instructions to the subcomponent source of the trace input if it is capable of stalling.

The formatted trace data is output side from the buffers 222-230 and is sent to the multiplexer 232. As described above, the multiplexer 232 combines the trace data signals received from each of the buffers 222-230 into a single data signal for transmission from the operational component 200 across a single physical channel. An arbitrator module 234 may be provided in conjunction with the multiplexer 232 to monitor the trace data flow from each of the buffers 222-230 and direct the interleaving functions of the multiplexer 232. Several exemplary purposes of the arbitrator 234 may include maximization of throughput of the trace data from each of the buffers 222-230, avoidance of data overflow in the buffers 222-230, and prioritization of throughput of trace data based upon urgency level alerts received from the buffers 222-230 set priorities with respect to particular ones of the functional blocks 202-210. The arbitrator 234 may also disable input to the multiplexer 232 for certain buffers if trace data for the corresponding functional block is not desired. The arbitrator 234 may be a separate device or module or may be part of the functionality of the multiplexer 232.

The arbitrator 234 may be set in one of several modes for managing the multiplexing of the trace data depending upon desired priorities for receipt of data at the test component. Several exemplary modes may include double round robin arbitration; urgent fixed priority/round robin arbitration; urgent round robin/fixed priority arbitration; and double fixed priority arbitration.

In one implementation, round robin arbitration may be used by the arbitrator 234 when all of the buffers 222-230 are not registering an urgent level. When one or more of the buffers escalates to an urgent status, all urgent buffers arbitrate in round robin fashion while non-urgent buffers are skipped until urgent levels have subsided or until other non-urgent buffers become urgent as well.

In another implementation, arbitration may be based upon a fixed priority scheme between the buffers when one or more of the buffers registers an urgent level. This may ensure that the trace data from a particular, prioritized functional block of the operational component 200 is received at the test component regardless of the disposition of trace data from other subcomponents. Any non-urgent buffers are skipped until urgent levels have subsided. When all buffers are not urgent, the arbitrator defaults to a round robin arbitration format.

In a further implementation, arbitration may be in a programmable fixed priority when all buffers are not at an urgent level. Arbitration may switch to a round robin format among all of the buffers when one or more of the buffers registers an urgent level. This may be beneficial when priority for a particular trace data source is generally desired, but then it monopolizes the bandwidth to the detriment of the output of the other buffers. Switching to a round robin upon such an occurrence would operate to rebalance the load.

In yet another exemplary implementation, arbitration may be in a fixed priority scheme both in an urgent level and in a non-urgent level. When all buffers are not in an urgent state, the arbitration may be a programmable fixed priority among all the buffers. When one or more of the buffers is in an urgent state, all urgent buffers may be arbitrated according to another programmable fixed priority while any non-urgent buffers are skipped.

Once the individual trace data streams are combined into a single signal by the multiplexer 232, the signal is passed to a transmission protocol engine 236. The transmission protocol engine 236 generates and inserts fields with special codes into the now serial data stream. These codes enable the data stream to be reconstructed by the external debug trace component. For example, the transmission protocol engine 236 may add a periodic synchronization fields to trace data frames to allow the receiver components on the external debug trace component to maintain a phase lock loop with the clock speed of the trace data output. After a reset or when starting up, the transmission protocol engine 236 may perform an initialization sequence with synchronization frames to ensure a phase lock loop is created with the receiver components on the test board. The transmission protocol engine 236 may further generate and output null frames except for the synchronization field when trace data is not present to keep the receiver at the test component in phase lock.

The transmission protocol engine 236 may also insert an alignment field into a data frame at regular, programmable intervals. The alignment values are provided to keep the trace data received at the serial receiver in bit alignment. An alignment value may be generated and transmitted at each programmed alignment interval. The alignment interval determines the number of frame transfers that are to occur between alignment operations. In one implementation, two conditions may cause an alignment operation: emergence from a reset action and lapse of a programmed interval. The receiver on the test component can detect the alignment field in any bit order. The bit, bytes, and words of the serial data stream may then be aligned in the correct position.

The transmission protocol engine 236 may also add integrity check characters and related protocol instructions to the trace data stream to validate the subchannel information once received by the external debug trace component. In one implementation, cyclic redundancy checking (CRC) may be used to perform the data validation. CRC is usually used to detect random, uncorrelated changes in data. CRC is a type of checksum algorithm takes a string of bytes and calculates from it a few bytes (the checksum) that depend on the entire file. If anything in the file changes, the checksum will change. In another implementation, error correction coding (ECC) may be used to perform the data validation. ECC is a system of scrambling data and recording redundant data as part of the packet. During decoding, this redundant information helps to detect and correct errors that may arise during data transmission. In one implementation, standard serial advanced technology attachment (SATA) field encoding may be used to provide the alignment, idle synchronization, and CRC checking values.

As discussed above, the formatters 212-220 may periodically insert an alignment mark into the data stream to provide synchronization between the data received from the various functional blocks 202-210. As previously indicated, the transmission protocol engine 236 may include identification logic to recognize the unique bit pattern of the alignment mark. The occurrence of an alignment mark also causes the transmission protocol engine 236 to generate and send an alignment mark packet to the test component. This packet contains the time stamp and an event number. The event number is incremented on each alignment mark event. This helps the debug effort by knowing that an alignment mark event occurred and provides an indication whether an alignment mark event was missed.

Once the protocol formatting of the data stream is complete, the transmission protocol engine 236 sends the serial data stream to an encoder 238. The encoder 238 converts the trace data stream into data packets of an appropriate format for transmission over one or more communication channels to the test component. As shown in FIG. 2, the operational component 200 may comprise a serial output port 240 with multiple high-speed serial transmission channels 242-248. Multiple serial ports allow for higher data throughput if necessary. In other implementations there may be only one serial port channel, or greater or fewer channels, based upon the data throughput required. The data packets from the encoder 238 may be distributed among the channels 242-248 of the serial output port 240 and reassembled in the original order upon reception at the test component.

Note that one of the channels in the serial output port is a serial input/output channel 248. As both an input and an output port, a return data stream from the external debug test component can be received by the operational component 200. Alternatively, a dedicated input channel may also be utilized for the return channel or other serial method such as the Joint Test Action Group (JTAG) standard may be used. Return data may be used for register accesses, setting hardware points, or providing other instructions or settings for debugging the operational component 200. Alternately, the operational component could have a separate parallel port for receiving the feedback data from the test component.

Figure 3:
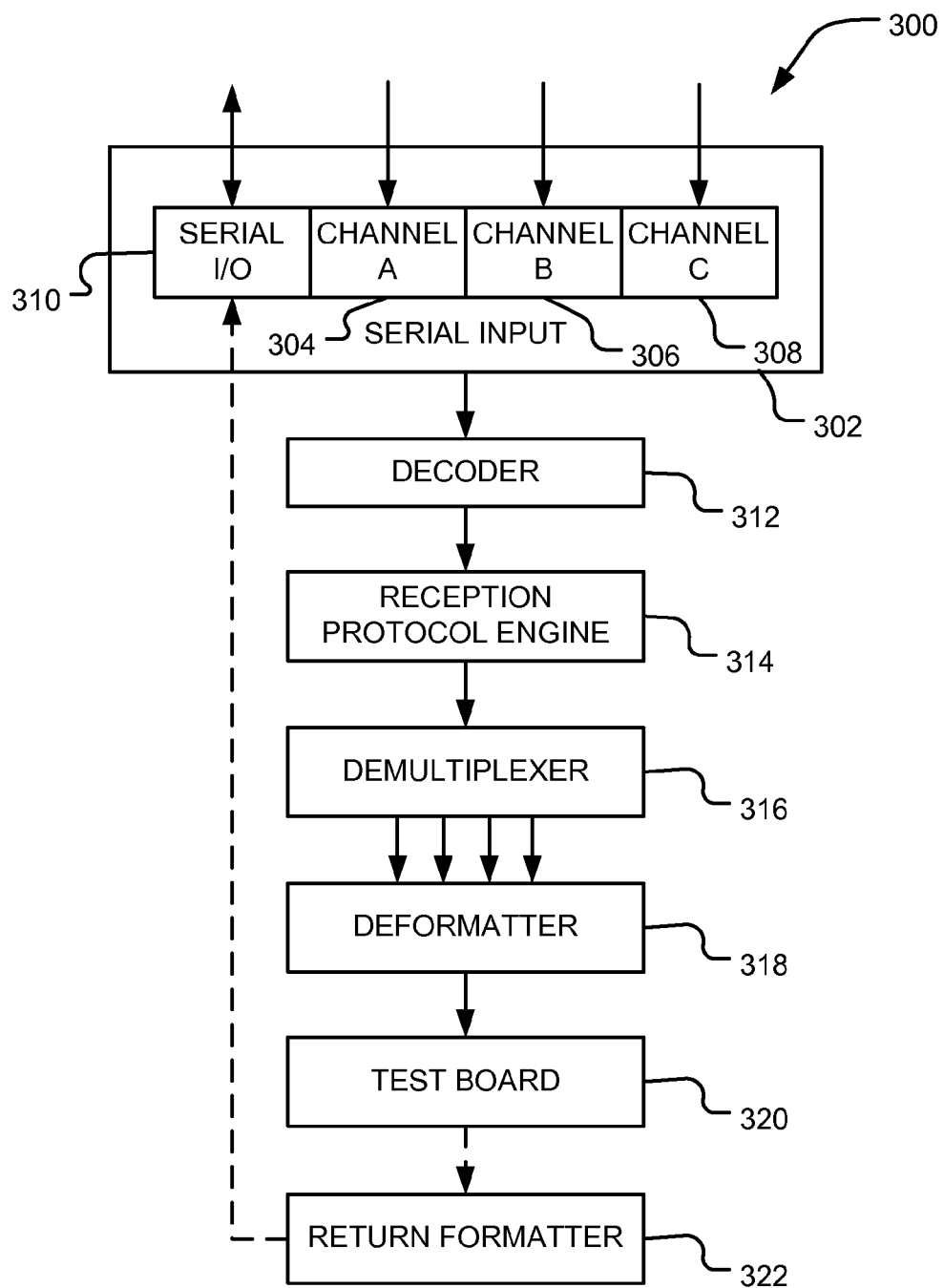
FIG. 3 is a schematic diagram of an implementation of a test component operable in conjunction with the serial trace system of FIG. 2.

FIG. 3 depicts an implementation of a test component 300 for use in conjunction with the operational component 200 of FIG. 2 to decode, separate, and frame the original trace data streams from functional blocks on the operational component 200. The test component 300 includes a high-speed serial data input port 302 with one or more channels 304-310 that receive the data on corresponding channels from the operational component. Once data packets are received via the channels 304-310 of the physical serial input port 302, the data packets are passed to a decoder 312 for reordering and decoding from the transmission format. The decoded packets are aligned into a single data stream.

The data stream is next processed by a reception protocol engine 314 which reconstructs, aligns, and validates the data stream using special code words and check characters. Any errors in the data stream are detected and corrected and the added fields, codes, and check characters inserted into the data stream before transmission to aid in the reconstruction and verification process are removed. The verified data stream is then deinterleaved in a demultiplexer 316 into the multiple trace data streams corresponding to the individual functional blocks. One or more deformatters 318 then processes the multiple channels of data and returns the data streams into the original structure and data format as generated by the functional blocks upon occurrence of an error event.

The original trace data is then provided to the appropriate debugging modules on a test board 320 of the test component. As part of the debugging process, if any information is generated for correction of the operational component, this correction or instruction data may be passed to a return formatter 322. Register corrections of other debugging instructions may be formatted by the return formatter 322 for use by the particular functional component in correcting any errors determined by the test board 320. Note that one of the channels 310 of the serial input port may be both an input/output channel. This channel 310 may be used to transmit the return information to the test component 300. Alternately, the test component 300 could have a separate parallel port for transmitting the feedback data to the operational component.

Figure 4:
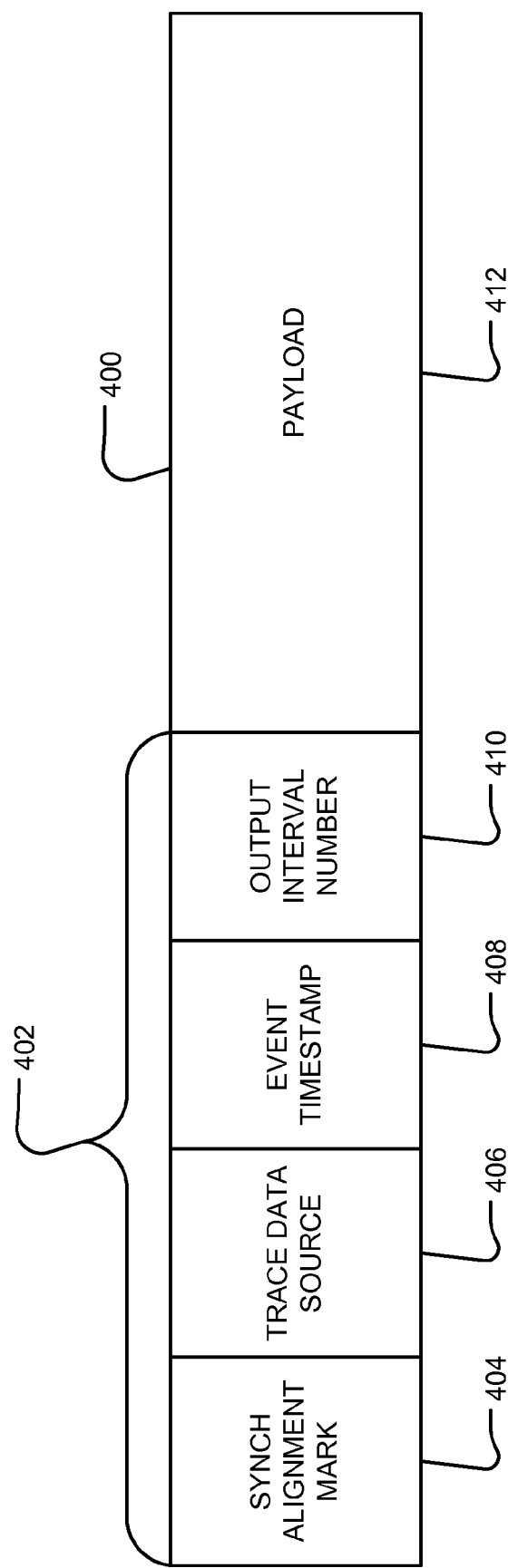
FIG. 4 is a schematic diagram of a data packet for use in an implementation of a serial trace protocol.

FIG. 4 depicts an exemplary implementation of a frame 400 in the serial trace data stream. The frame consists of a header section 402 and a payload section 412. The header section 402 carries the information added to the trace data for alignment and data integrity while the payload section 412 consists of the actual trace event data from the functional blocks. The header section 402 may contain multiple fields for data appended by the formatters and the transmission protocol engine, for example, the synch alignment mark 404, the source identification for the trace data 406, the event time stamp 408, and the output interval number 410 corresponding to the alignment marks. Other formatting, correction, and protocol information may similarly be placed in the header section 402.

Figure 5:
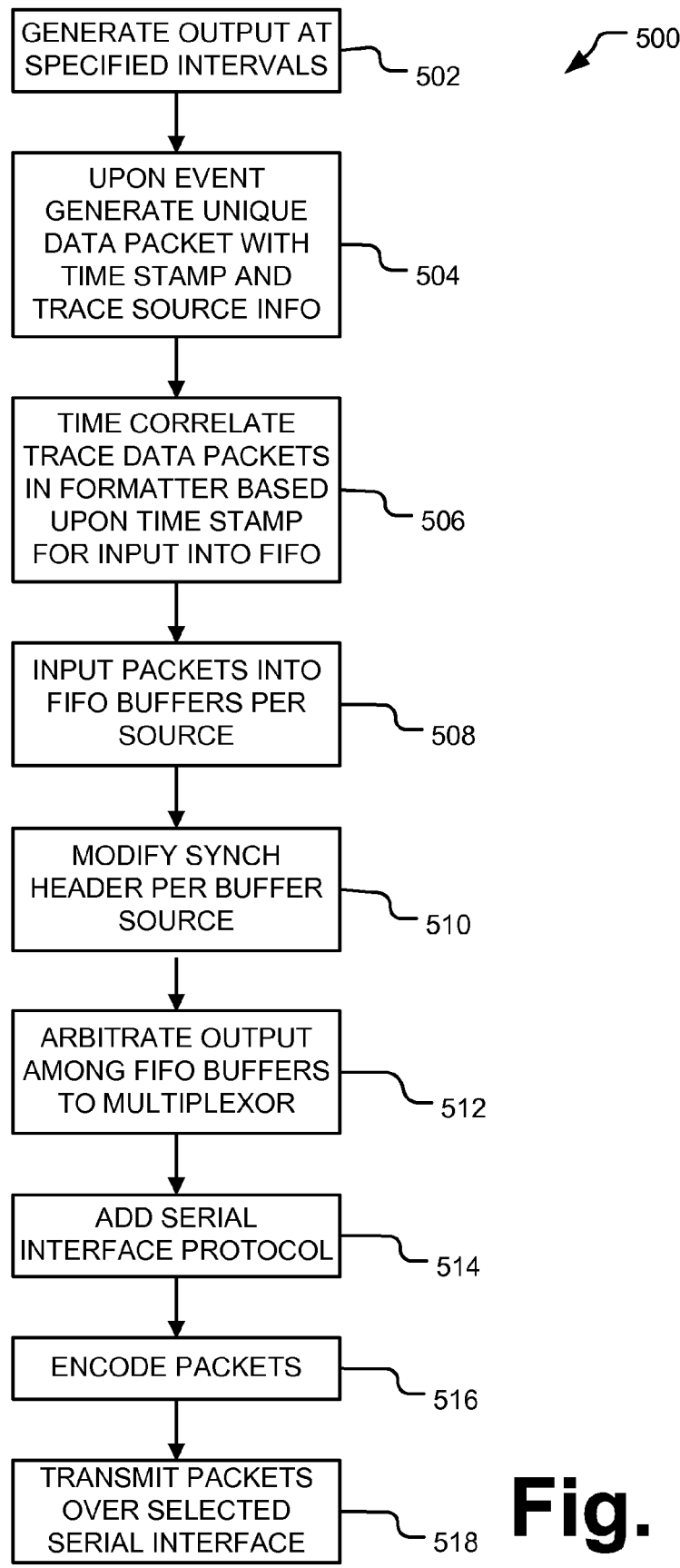
FIG. 5 is a flow diagram of a method for implementing a serial trace protocol on a hardware device.

Exemplary operations in a process 500 for creating a serial trace data stream are presented in FIG. 5. Initially in a generating operation 502, a functional block generates trace data output at specified intervals. The intervals may be programmable. An exemplary functional block in an operational component with this functionality is an ARM processor using an A-Sync protocol.

Upon each output event from a functional block, a unique data packet, for example, as presented in FIG. 4, is generated in a formatter in a second generating operation 504. This packet may contain several header fields as described in greater detail above. One of the header fields may be an alignment mark, to make the packet specifically identifiable from other packets. The formatters generally operate on different clock cycles corresponding to the functional blocks that they service. Packets are generated with the alignment marks at a rate based upon time stamps from respective clocks. While there may be some synchronization uncertainty between formatters and corresponding time signatures from differing clocks, the time stamps will generally be within a few cycles. For trace purposes, this is adequate. There may also be a header field in the packet that is used to identify the particular functional block source of the trace data. There may further be a field carrying a time stamp value indicating the time of occurrence of the event. There may also be a field containing a running count of the number of intervals described that have occurred. This packet may also contain a field for a time stamp of the time at which a particular event captured in the trace data occurred. As the packet is part of a system that accepts trace data from multiple sources, the packets may have an additional header field that identifies it as a trace data packet from a specific source.

All of the formatters may receive data with correlating time stamps to create generally synchronized alignment marks. The time stamp field allows the formatter to maintain time correlation of the trace data as received from the functional blocks in an ordering operation 506. The packetized data from the formatters corresponding to each of the trace data sources is input into a FIFO buffer specific to that trace data source in an inputting operation 508, maintaining the order it was received. Next, in a modification operation 510, the header field for the alignment mark in the packet that uniquely identifies the trace data source is modified to reflect the source of the buffer corresponding to the trace data source.

An arbitration operation 512 selects which of the buffers is to output a packet in successive arbitration time slots. Selection of a buffer for output of a packet may be made according to a variety of schemes including, for example, round robin and fixed priority previously described in detail above, and may further switch priority to avoid buffer overflow. The packets are removed from each buffer in the same order in which they were input. The packet from the buffer that is selected pursuant to the arbitration is sent in an adding operation 514 to the transmission protocol engine where the packet is further appended with serial transmission protocol fields to ensure alignment, data integrity, and a phase lock between the serial output of the operational component and the serial input of the testing component. The trace data packet is then encoded for transmission in encoding operation 516. Finally, the encoded packet is transmitted over a selected serial port channel to the test component in transmission operation 518.

Figure 6:
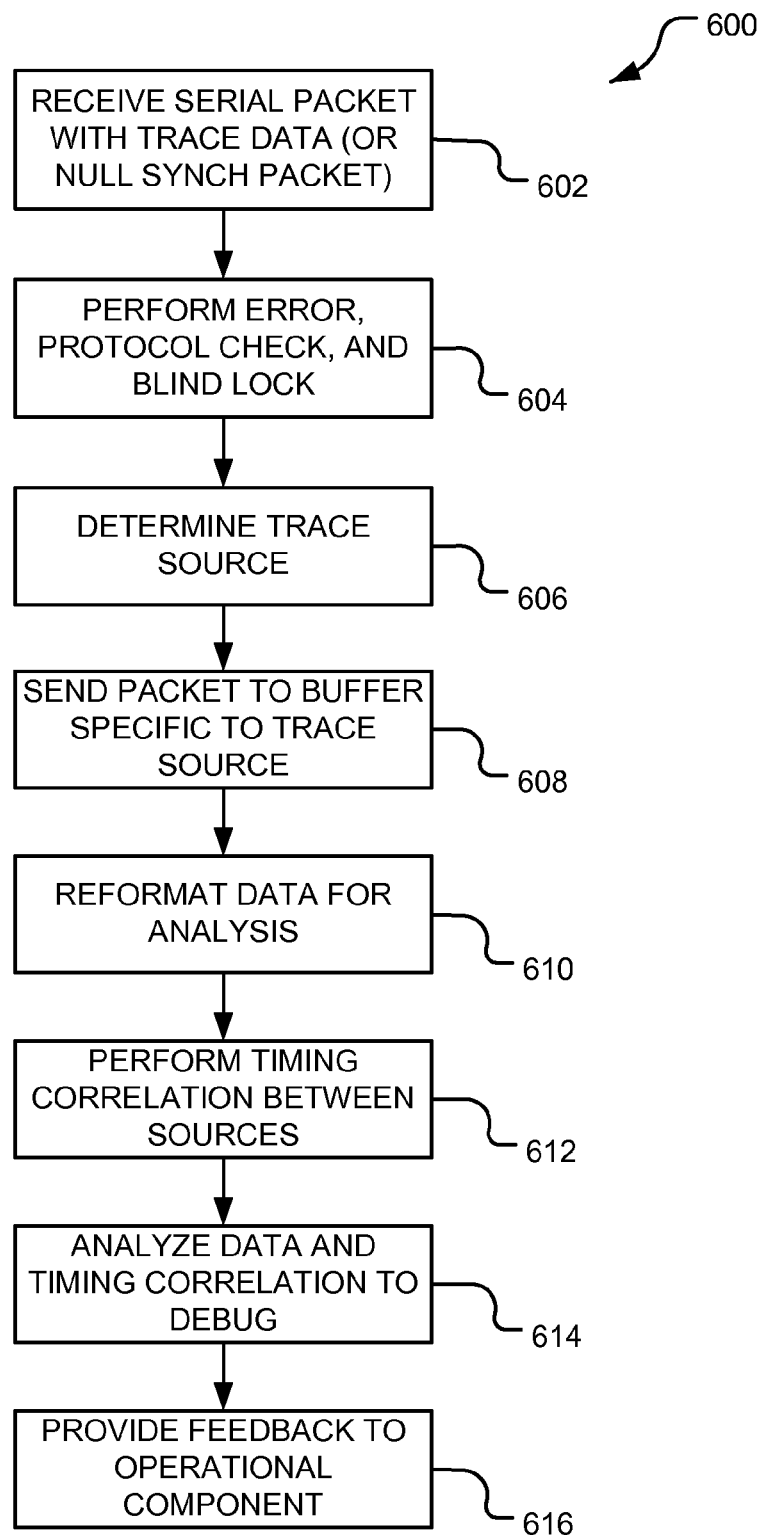
FIG. 6 is a flow diagram of a method for implementing a serial trace protocol on a test component.

Exemplary operations in a process 600 for receiving packets from the operational module are depicted in FIG. 6. The serial port receiver of the test component receives the packet at a serial input channel in receiving operation 602. The data stream received may then be decoded and reconstituted, checked for errors and data integrity, aligned, and blindly locked to the transmission rate in checking operation 604. The packet header is then analyzed as to which trace source it belongs to in determining operation 606. The packet is then directed to a buffer related to the trace source buffer from which the packet came from in sending operation 608. Output from the buffers is then reformatted to reconstitute the original form of the trace data emanating from the functional blocks 610.

Timing correlation between each of the trace sources may next be performed in a correlating operation 612 by finding the matching alignment marks in the packets identifying a single event in time relating to each of the trace sources. The trace data and timing correlations between data from separate functional blocks is then analyzed through the test board on the test component to debug the operational component in analyzing operation 614. Finally, feedback from the debugging operations may be provided to the operational component through a backchannel in providing operation 616. This feedback information may be used by the operational component to reset registers and correct glitches in the functional blocks of the operational component.

An exemplary computer system 700 for interfacing with the test component and managing the debugging process is depicted in FIG. 7. The computer system 700 may be a personal computer (PC) with internal processing and memory components as well as interface components for connection with external input, output, storage, network, and other types of peripheral devices. Internal components of the computer system in FIG. 7 are shown within the dashed line and external components are shown outside of the dashed line. Components that may be internal or external are shown straddling the dashed line. Alternatively to a PC, the computer system 700 may be in the form of any of a notebook or portable computer, a tablet PC, a handheld media player (e.g., an MP3 player), a smart phone device, a video gaming device, a set top box, a workstation, a mainframe computer, a distributed computer, a server, an Internet appliance, or other computer devices, or combinations thereof.

The computer system 700 includes a processor 702 and a system memory 706 connected by a system bus 704 that also operatively couples various system components. There may be one or more processors 702, e.g., a single central processing unit (CPU), or a plurality of processing units, commonly referred to as a parallel processing environment. The system bus 704 may be any of several types of bus structures including a memory bus or memory controller, a peripheral bus, a switched-fabric, point-to-point connection, and a local bus using any of a variety of bus architectures. The system memory 706 includes read only memory (ROM) 708 and random access memory (RAM) 710. A basic input/output system (BIOS) 712, containing the basic routines that help to transfer information between elements within the computer system 700, such as during start-up, is stored in ROM 708. A cache 714 may be set aside in RAM 710 to provide a high speed memory store for frequently accessed data.

A hard disk drive interface 716 may be connected with the system bus 704 to provide read and write access to a data storage device, e.g., a hard disk drive 718, for nonvolatile storage of applications, files, and data. A number of program modules and other data may be stored on the hard disk 718, including an operating system 720, one or more application programs 722, other program modules 724, and data files 726. In an exemplary implementation, the hard disk drive 718 may further store a test component application module 764 for monitoring the trace data and the debugging process on the test component according to the exemplary processes described herein above. Note that the hard disk drive 718 may be either an internal component or an external component of the computer system 700 as indicated by the hard disk drive 718 straddling the dashed line in FIG. 7. In some configurations, there may be both an internal and an external hard disk drive 718.

The computer system 700 may further include a magnetic disk drive 730 for reading from or writing to a removable magnetic disk 732, tape, or other magnetic media. The magnetic disk drive 730 may be connected with the system bus 704 via a magnetic drive interface 728 to provide read and write access to the magnetic disk drive 730 initiated by other components or applications within the computer system 700. The magnetic disk drive 730 and the associated computer-readable media may be used to provide nonvolatile storage of computer-readable instructions, data structures, program modules, and other data for the computer system 700.

The computer system 700 may additionally include an optical disk drive 736 for reading from or writing to a removable optical disk 738 such as a CD ROM or other optical media. The optical disk drive 736 may be connected with the system bus 704 via an optical drive interface 734 to provide read and write access to the optical disk drive 736 initiated by other components or applications within the computer system 700. The optical disk drive 730 and the associated computer-readable optical media may be used to provide nonvolatile storage of computer-readable instructions, data structures, program modules, and other data for the computer system 700.

A display device 742, e.g., a monitor, a television, or a projector, or other type of presentation device may also be connected to the system bus 704 via an interface, such as a video adapter 740 or video card. Similarly, audio devices, for example, external speakers or a microphone (not shown), may be connected to the system bus 704 through an audio card or other audio interface (not shown).

In addition to the monitor 742, the computer system 700 may include other peripheral input and output devices, which are often connected to the processor 702 and memory 706 through the serial port interface 744 that is coupled to the system bus 706. Input and output devices may also or alternately be connected with the system bus 704 by other interfaces, for example, a universal serial bus (USB), a parallel port, or a game port. A user may enter commands and information into the computer system 700 through various input devices including, for example, a keyboard 746 and pointing device 748, for example, a mouse. Other input devices (not shown) may include, for example, a microphone, a joystick, a game pad, a tablet, a touch screen device, a satellite dish, a scanner, a facsimile machine, and a digital camera, and a digital video camera. Other output devices may include, for example, a printer 750, a plotter, a photocopier, a photo printer, a facsimile machine, and a press (the latter not shown). In some implementations, several of these input and output devices may be combined into a single device, for example, a printer/scanner/fax/photocopier. It should also be appreciated that other types of computer-readable media and associated drives for storing data, for example, magnetic cassettes or flash memory drives, may be accessed by the computer system 700 via the serial port interface 744 (e.g., USB) or similar port interface.

The computer system 700 may operate in a networked environment using logical connections through a network interface 752 coupled with the system bus 704 to communicate with one or more remote devices. The logical connections depicted in FIG. 7 include a local-area network (LAN) 754 and a wide-area network (WAN) 760. Such networking environments are commonplace in home networks, office networks, enterprise-wide computer networks, and intranets. These logical connections may be achieved by a communication device coupled to or integral with the computer system 700. As depicted in FIG. 7, the LAN 754 may use a router 756 or hub, either wired or wireless, internal or external, to connect with remote devices, e.g., the test component or a remote computer 758, similarly connected on the LAN 754. The remote computer 758 may be another personal computer, a server, a client, a peer device, or other common network node, and typically includes many or all of the elements described above relative to the computer system 700. In one implementation, the test component may be an integral part of the computer system 700 or implemented on the computer system in software via the test component module 764 and the operational component may be directly connected with the computer system 700 via the LAN 754 for testing.

To connect with a WAN 760, the computer system 700 typically includes a modem 762 for establishing communications over the WAN 760. Typically the WAN 760 may be the Internet. However, in some instances the WAN 760 may be a large private network spread among multiple locations. The modem 762 may be a telephone modem, a high speed modem (e.g., a digital subscriber line (DSL) modem), a cable modem, or similar type of communications device. The modem 762, which may be internal or external, is connected to the system bus 718 via the network interface 752. In alternate embodiments the modem 762 may be connected via the serial port interface 744. It should be appreciated that the network connections shown are exemplary and other means of and communications devices for establishing a communications link between the computer system and other devices or networks may be used.

Although various embodiments of this invention have been described above with a certain degree of particularity, or with reference to one or more individual embodiments, those skilled in the art could make numerous alterations to the disclosed embodiments without departing from the spirit or scope of this invention. All directional references (e.g., proximal, distal, upper, lower, upward, downward, left, right, lateral, front, back, top, bottom, above, below, vertical, horizontal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the basic elements of the invention as defined in the following claims.

What is claimed is:

1. An operational component in a hardware device comprising:
   a formatter that receives a trace data output from a plurality of functional blocks adapted to output trace data for use in a debugging process and transforms the trace data from each of the functional blocks into data packets of a common format and a uniform data rate;
   an arbitrator that manages an output of multiple data streams from the formatter based upon one or more programmable scheduling schemes to determine a selection of data packets from each of the multiple data streams for output as a serial data stream; and
   a serial data port that outputs the serial data stream from the operational component.

2. The operational component of claim 1, wherein
   the formatter comprises a plurality of formatters corresponding respectively to each of the functional blocks; and wherein the operational component further comprises
   a plurality of buffers corresponding respectively to each of the plurality of formatters that receive the data packets from the respective formatters; and wherein
   the arbitrator further monitors data fill levels in each of the buffers and changes between the scheduling schemes to prevent overflow in any of the buffers; and
   each of the buffers stores packets of trace data corresponding to a respective functional block until the arbitrator directs output of the data packets from a particular one of the buffers.

3. The operational component of claim 2, wherein the formatters insert a time stamp into the trace data for correlation of substantially simultaneous events occurring at two or more of the functional blocks.

4. The operational component of claim 1 further comprising
   a transmission protocol engine that receives the serial data stream output from the arbitrator and adds synchronization values to the serial data stream for use by a test component receiving the serial data stream to implement a blind lock with the operational component.

5. The operational component of claim 4, wherein the transmission protocol engine further applies a data integrity scheme to the serial data stream to mitigate errors due to transmission of the serial data stream when reconstituted after receipt at a test component.

6. The operational component of claim 1, wherein the serial data port comprises a plurality of subchannels and the serial data port distributes the serial data stream among the plurality of subchannels to increase throughput.

7. The operational component of claim 1, wherein the serial data port comprises an input port to receive return data from an external test component.

8. The operational component of claim 1, wherein
the operational component is an integrated circuit chip with a number of output pins corresponding to the serial data port; and
the number of output pins is less than a second number of output pins that would be required for a comparable integrated circuit chip using one or more parallel ports to output an equivalent quantity of the trace data at an equivalent data rate.

9. A method for performing a serial trace debug of a hardware device, the method comprising:
outputting trace data from a plurality of functional blocks in an operational component of the hardware device;
transforming the trace data from each of the functional blocks into multiple data packets of a common format and a uniform data rate;
managing the data streams based upon one or more programmable scheduling schemes that determine a selection of the trace data for output;
multiplexing the selected trace data from the multiple data streams into a serial data stream; and
transmitting the serial data stream from the operational component to a test component.

10. The method of claim 8 further comprising
buffering the multiple data streams corresponding to each of the functional blocks in a respective plurality of first-in, first-out storage buffers; and
monitoring data fill levels in each of the buffers and implementing changes between the scheduling schemes to prevent overflow in any of the buffers before the multiplexing operation.

11. The method of claim 8 further comprising inserting a time stamp into the trace data for correlation of simultaneous events occurring at two or more of the functional blocks.

12. The method of claim 8 further comprising applying a data integrity scheme to the serial data stream to mitigate errors due to transmission of the serial data stream when reconstituted after receipt at a test component.

13. The method of claim 8 further comprising inserting synchronization values into the serial data stream for use by a test component receiving the serial data stream to implement a blind phase lock with the operational component.

14. The method of claim 8 further comprising distributing the serial data stream among a plurality of serial output port subchannels to increase throughput of the serial data stream.

15. A hard disk drive comprising
a plurality of functional blocks adapted to output trace data for use in a debugging process;
a plurality of formatters, corresponding respectively to each of the functional blocks, that receive the trace data output from the functional blocks and transform the trace data from each of the functional blocks into data packets of a common format and output the data packets at a uniform data rate in multiple data streams each corresponding to a respective functional block;
a plurality of buffers, corresponding respectively to each of the plurality of formatters, that store the data packets of respective ones of the multiple data streams;
a multiplexer that receives output from the buffers of the multiple data streams corresponding to the data packets output from each of the functional blocks and combines the multiple data streams into a serial data stream;
an arbitrator that manages the output of the multiple data streams from the buffers for input into the multiplexer based upon one or more programmable scheduling schemes that determine the selection of a particular one of the multiple data streams for input;
a transmission protocol engine that receives the serial data stream output from the multiplexer and adds synchronization values to the serial data stream for use by a test component receiving the serial data stream to implement a blind phase lock with the operational component; and
a serial data port that outputs the serial data stream from the operational component.

16. The hard disk drive of claim 15, wherein the arbitrator further monitors data fill levels in each of the buffers and changes between the scheduling schemes to prevent overflow in any of the buffers.

17. The hard disk drive of claim 15, wherein the formatters are synchronized and insert a time stamp into the trace data for correlation of simultaneous events occurring at two or more of the functional blocks.

18. The hard disk drive of claim 15, wherein the transmission protocol engine further applies a data integrity scheme to the serial data stream to mitigate errors due to transmission of the serial data stream when reconstituted after receipt at a test component.

19. The hard disk drive of claim 15, wherein the serial data port comprises a plurality of subchannels and the serial data port distributes the serial data stream among the plurality of subchannels to increase throughput.

20. The hard disk drive of claim 15, wherein the serial data port comprises an input port to receive return data from an external test component.

21. The hard disk drive of claim 15, wherein
the functional blocks are components of an integrated circuit chip with a number of output pins corresponding to the serial data port; and
the number of output pins is less than a second number of output pins that would be required for a comparable integrated circuit chip using one or more parallel ports to output an equivalent quantity of the trace data at an equivalent data rate.

* * * * *